Feb. 24, 1953 R. N. BAKER 2,629,623
GUARD FOR VEHICLE BUMPERS
Filed Oct. 15, 1949 2 SHEETS—SHEET 2
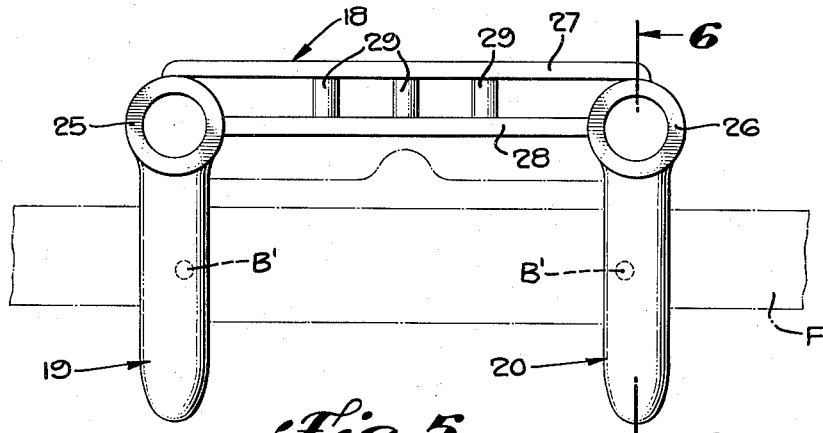
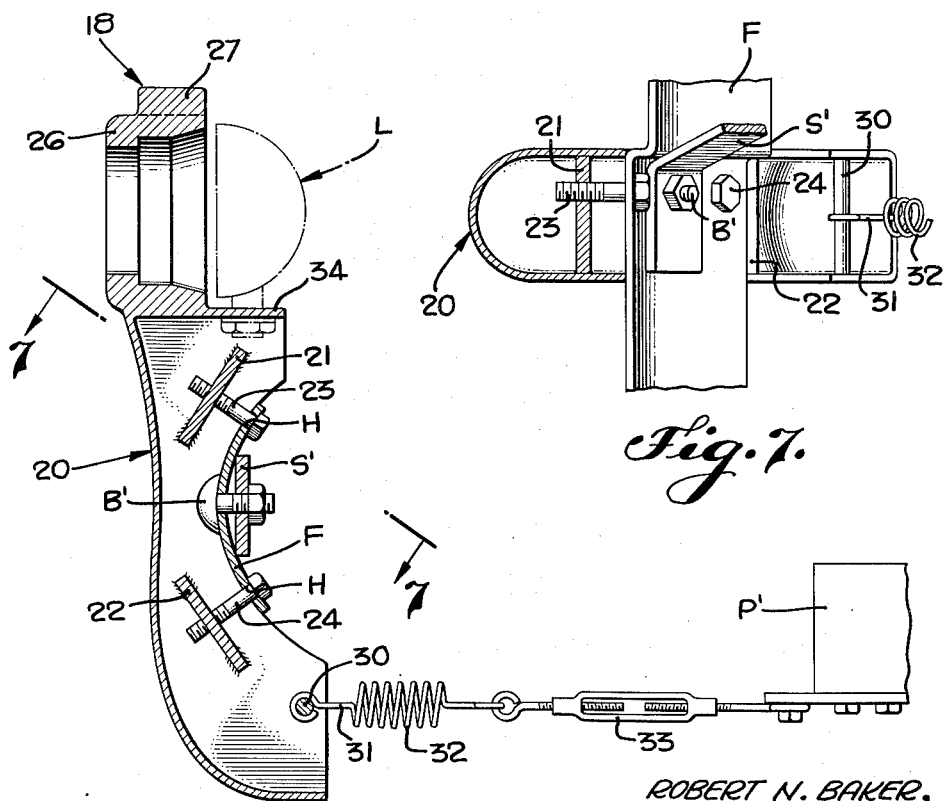
ROBERT N. BAKER,
INVENTOR.
BY Harold J LeViscoute
ATTORNEY Patented Feb. 24, 1953

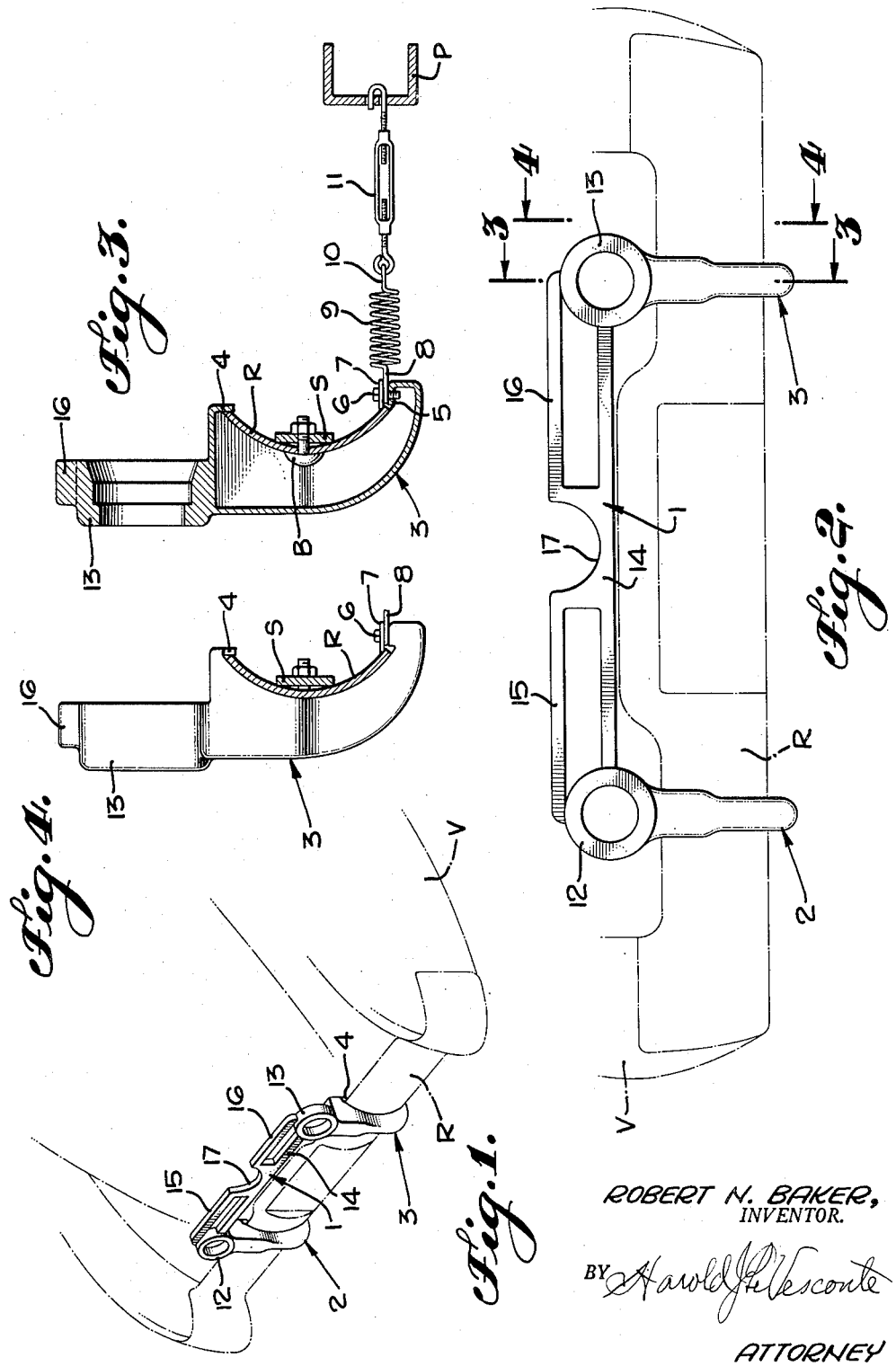

2,629,623

UNITED STATES PATENT OFFICE 2,629,623

GUARD FOR VEHICLE BUMPERS

Robert N. Baker, Los Angeles, Calif., assignor, by mesne assignments, to Hugh Givens and R. N. Baker Application October 15, 1949, Serial No. 121,533

13 Claims. (Cl. 293—64)

This invention relates to bumper guards for motor vehicles and particularly to a form thereof designed to relieve the bumper supporting spring element from torsional stress incident to impact on the bumper guard at a point above the plane of the spring element on which the bumper is mounted.

All passenger motor vehicles are provided with front and rear bumpers adapted to protect the body structure from damage from collisions or other impacts. Due to varying designs of vehicles and bumper it has been customary to provide bumpers with guard elements which extend above the top edge of the bumper and which serve to protect the vehicle in the area thus protected from collision damage. The defect of such guards is that in the event of an impact on the guard alone a twisting or bending action is imparted to the bumper and the mounting bolts for both the bumper and the guard with the frequent results that the bolts are often sheared off even under an impact that could be readily absorbed by the bumper if it were struck directly.

With the foregoing considerations in mind, it is an object of the invention to provide a bumper guard construction in which impacts delivered on the guard alone will be absorbed with a decreased tendency of subjecting the bumper and guard mounting bolts to torsional strains.

Another object of the invention is to provide a bumper guard construction having the above desirable characteristics and which may be mounted on the bumpers of existing vehicles.

A further object of the invention is to provide a bumper guard construction in which the bumper supporting spring means is subjected to an opposed spring bias at a point below the bumper effective upon impact against the bumper guard above the bumper to oppose and cancel out torsional strains arising from the impact.

Still another object of the invention is to provide a pre-stressed torsion resisting bumper guard construction including means by which the imposed torsion resisting stress may be varied to suit individual installations.

With the above objects in view, together with such other objects and advantages as may subsequently appear, the invention resides in the parts, and in the construction, combination, and arrangement of parts, described by way of example, in the following specification; reference being had to the accompanying drawings forming a part of said specification and in which:

Fig. 1 is a perspective view of a form of the invention applied to the rear bumper of a passenger vehicle, Fig. 2 is an enlarged elevation of Fig. 1, as viewed looking toward the rear end of the vehicle, Figs. 3 and 4 are enlarged vertical, transverse sections taken on the lines 3—3 and 4—4 of Fig. 2, Fig. 5 is an elevation of another form of the invention adapted to be applied to the front bumper of a vehicle as viewed looking toward the front end of a vehicle, Fig. 6 is an enlarged transverse sectional view taken on the line 6—6 of Fig. 4, and Fig. 7 is a fragmentary sectional view taken on the line 7—7 of Fig. 6.

Referring first to Figs. 1 to 4 there is shown the rear end of a vehicle V having the usual rear bumper R, extending across the end of the vehicle; the bumper being mounted at spaced points along the length thereof on a spring member S by bolts B as is the usual practice.

The form of the invention here shown comprises a guard member of shallow inverted U-shape comprising a cross member structure 1 and depending leg elements 2 and 3 formed integrally with the cross member structure 1 by any suitable means such as casting, welding or forging as may be expedient. The leg elements are generally of U-shaped cross section with the edges of the open side thereof contoured to engage the outer face of the bumper and are preferably spaced apart so that they house and conceal the bolts B by which the bumper R is attached to its yielding support spring S. Each leg member at its upper rear edge is provided with a depending lip portion 4 adapted to hook over the upper edge of the bumper and at their lower ends, each leg member is provided with a horizontal rearwardly extending flange 5 which has a threaded hole to receive a screw 6, which before entering the flange, extends first through a washer 7, the rim of which engages the edge of the bumper, and thence through the looped end 8 of a tension spring 9. Upon tightening the screw 6 the head thereof by engaging the washer will clamp the washer and spring end against the flange 5 and the rim of the washer will grip the edge of the bumper and thus clamp the leg member to the bumper. The opposite end 10 of the spring 9 is likewise formed into a loop or hook which is engaged by one end of a turn buckle 11 the other end of which is attached to a portion P of the vehicle frame in any suitable manner.

At their upper ends, the leg members 2 and 3 terminate in heavy, ring portions 12 and 13, the adjacent sides of which are connected by the cross member 1 comprising a lower cross element 14 and a pair of shorter cross elements 15 and 16.

which at the mid-point between the leg members, are interrupted by a semicircular notch 17 which affords access to the trunk compartment lock and handle of the vehicle and prevents damage to the lock and handle by movement of the guard incident to impact. The length of the cross member 1 is such that either the stop lights or the backup lights of the vehicle will show through the ring portions 12 and 13. As before stated, the guard element thus described is preferably formed integrally by any appropriate process.

The operation of the device is as follows. Upon installation of the guard, the turn buckles 11 are tightened until the springs associated therewith impose an initial load on the bumper and its spring mounting. When the bumper guard at some point above the bumper is subjected to a load tending to push it and the bumper toward the vehicle, as in a collision of vehicles, that load, without the springs 9 tends to produce a twisting movement on the bumper resulting in shearing off the mounting bolts. The load on the springs 9, 9 being opposed to the bumper spring assists the bumper in moving back in a straight line in response to impact on the guard at a point above the upper edge of the bumper with less likelihood that the impact will cause damage to the vehicle body and less tendency to shear off the bumper mounting bolts.

The form of the invention shown in Figs. 5, 6 and 7 shows the adaptation of the invention to a front bumper F. In this form of the invention, the guard is likewise integrally formed and comprises a top member 18 and depending leg portions 19 and 20 at each end thereof. These leg portions are generally of U-shaped cross section with the edges forming the open side thereof contoured to fit the front face of the bumper F which is mounted by bolts B' on a spring element S' extending across the front of the vehicle. Adjacent its upper and lower ends each of the leg portions 19 and 20 are provided with integrally formed webs 21 and 22 spaced from and disposed tangentially with respect to the curvature of the bumper. Extending through the holes H, H in the bumper are bolts 23 and 24 which are threaded into the webs 21 and 22 which secure the leg portions 19 and 20 on to the bumper with the heads of the bolts B' being concealed therebeneath (see Fig. 6). The holes H, H are those used to secure the conventional, vertically extending bumper guards to the bumper.

The upper ends of the leg portions terminate in heavy ring portions 25 and 26 the adjacent sides of which are connected by the top member structure comprising upper and lower horizontal bars 27 and 28 with a series of vertical members 29 extending between them. At their lower ends each of the leg portions 19 and 20 is provided with a cross pin 30 engaged by the looped end 31 of a tension spring 32, the other end of which is looped to engage one end of a turn buckle 33 connected to a portion P' of the vehicle frame.

Adjacent the lower edge and in rear of the ring members 25 and 26 the upper ends of the leg portions 19 and 20 may be provided with a horizontal shelf portion 34 on which a fog lamp L may be mounted to project light through the rings.

In the event of impact against the bumper guard with the attendant tendency to twist the bumper about a horizontal axis extending in the plane of the bumper mounting bolts, such tendency will be initially resisted by the tension springs attached to the lower edge of the bumper and the combined forces of the impact and the load imparted by these springs will tend to move the bumper bodily toward the vehicle body against the resistance offered by the spring on which it is mounted. Due to this action, impacts can be absorbed by the bumper guard which, without the compensating spring action, would shear off the bolts on which the bumper is mounted. Further, due to this compensating action, bumper guards may be used which extend to a greater height above the bumper than would be practical without the spring compensation forming a part of the invention.

It will be appreciated that for different models of vehicles, the form of the bumper engaging faces of the bumper guards would have to be modified as well as the mode of attachment and that this can be done without departing from the principles of the invention, and, therefore, I do not intend that the invention shall be limited to the exact form herein described and illustrated but that it shall embrace all such modifications in the parts and in the construction, combination, and arrangement of parts as shall come within the purview of the appended claims.

I claim:

1. A bumper guard for motor vehicles comprising a unitary body member comprising a horizontal portion disposed above and parallel to the bumper and depending leg portions at each end thereof, means for securing the lower ends of said leg portions to a bumper, and tension spring means extending between the lower ends of said leg portions and the frame structure of the vehicle.

2. A bumper guard for motor vehicles comprising a unitary body structure of shallow, inverted U-shape; the lower portions of the leg portions thereof being attachable to a vehicle bumper with the extremities of said leg portions projecting below the lower end of the bumper and the portion connecting the leg portions being disposed above and parallel to the bumper, a stressed tension spring extending between each of said extremities and the vehicle frame structure effective to initially counteract torsional stresses on the bumper mounting arising from impact of the guard with an object.

3. A bumper guard for motor vehicles comprising a unitary body structure of shallow, inverted U-shape; the lower portions of the leg portions thereof being attachable to a vehicle bumper with the extremities of said leg portions projecting below the lower end of the bumper and the portion connecting the leg portions being disposed above and parallel to the bumper, a stressed tension spring extending between each of said extremities and the vehicle frame structure effective to initially counteract torsional stresses on the bumper mounting arising from impact of the guard with an object; said guard at the juncture of each leg portion with the connecting portion of said guard having openings through which the light from vehicle lamps may be projected and observed.

4. A bumper guard for motor vehicles comprising a unitary body member comprising a horizontal portion and depending leg portions at each end thereof, means for securing the lower ends of said leg portions to a bumper, and tension spring means extending between the lower ends of said leg portions and the frame structure of the vehicle; said tension spring means including a turn buckle interposed between each of said springs, and the frame structure of the vehicle operable to vary the tension of said springs.

5. A bumper guard for motor vehicles comprising a guard member positioned above and parallel to a bumper, said member having a depending leg portion at each end thereof, a bumper engaging surface adjacent the free ends of each of said leg portions, means for detachably securing each of said leg portions to a bumper, a tension spring having one end thereof attached to one of said leg portions below the bumper and having the other end attached to the vehicle frame at a point so disposed that said spring extends substantially parallel to the longitudinal axis of the vehicle, a second tension spring similarly connected to the other leg portion of said guard and extending substantially parallel to said first spring and means associated with each of said springs manually operable to regulate the extent of tension exerted thereby.

6. A guard for motor vehicles having a spring mounted bumper comprising a unitary body structure of inverted U-shape; the leg portions thereof being adapted to be detachably connected to the exterior surface of a spring mounted bumper with the extremities of said leg portions projecting below said bumper in the region of attachment thereto and spring means operating in opposition to the bumper carrying spring extending between the free ends of each of said leg portions and the vehicle frame effective to initially counteract torsonal stresses communicated to the bumper by an impact on said guard above the bumper.

7. A guard for motor vehicles having a spring mounted bumper comprising a unitary body structure of inverted U-shape; the leg portions thereof being adapted to be detachably connected to the exterior surface of a spring mounted bumper with the extremities of said leg portions projecting below said bumper in the region of attachment thereto and spring means operating in opposition to the bumper carrying spring extending between the free ends of each of said leg portions and the vehicle frame effective to initially counteract torsional stresses communicated to the bumper by an impact on said guard above the bumper; each of said spring means comprising a tension coil spring and a turn buckle operable to vary the initial stress applied by the spring means to the bumper and guard assembly.

8. A guard for motor vehicles having a spring mounted bumper comprising a unitary body structure including a plurality of horizontally extending bars, and a leg portion depending from each end thereof; each of said leg portions adjacent the extremity thereof having a portion adapted to fit the exterior face of a bumper, means for securing said leg portions to a bumper with the horizontal portion of the guard spaced above the bumper, and spring means connected to each of said leg portions and the frame of said vehicle effective to initially counteract the tendency of an impact on said guard to produce a torsional stress on the bumper.

9. A guard for vehicles having a spring mounted rear bumper and having a trunk compartment lock disposed in proximity to the bumper; said guard comprising a horizontal member with an integral depending leg at each end thereof, means for attaching the free ends of said legs to a bumper with the horizontal portion disposed above and parallel to the bumper, and spring means extending between each of said legs effective to initially counteract the tendency of an impact on said guard to produce a torsional stress on the bumper; said horizontal member having a clearance notch disposed opposite the trunk compartment lock of the vehicle.

10. A guard for vehicles having a spring mounted rear bumper and having a trunk compartment lock disposed in proximity to the bumper; said guard comprising a horizontal member with an integral depending leg at each end thereof, means for attaching the free ends of said legs to a bumper with the horizontal portion disposed above and parallel to the bumper, and spring means extending betwen each of said legs effective to initially counteract the tendency of an impact on said guard to produce a torsional stress on the bumper; said guard at the ends of said horizontal member having openings therethrough in axial alignment with lights at the rear of the vehicle.

11. A bumper guard for motor vehicles comprising a unitary body member comprising a horizontal portion disposed above and parallel to the bumper and depending leg portions at each end thereof, means for securing the lower ends of said leg portions to a bumper, and tension spring means extending between the lower ends of said leg portions and the frame structure of the vehicle; said securing means comprising pairs of bolts extending through the bumper adjacent the upper and lower edges thereof opposite each of said leg portions and threadedly engaging holes in said members.

12. A bumper guard for motor vehicles comprising a unitary body member comprising a horizontal portion disposed above and parallel to the bumper and depending leg portions at each end thereof; means for securing the lower ends of said leg portions to a bumper, and tension spring means extending between the lower ends of said leg portions and the frame structure of the vehicle; said securing means comprising a ledge on each leg portion engageable with the upper edge of a bumper and a clamp means carried by each of said leg portions engageable with the lower edge of a bumper.

13. A bumper guard for motor vehicles comprising a unitary body member comprising a horizontal portion disposed above and parallel to the bumper and depending leg portions at each end thereof, means for securing the lower ends of said leg portions to a bumper, and tension spring means extending between the lower ends of said leg portions and the frame structure of the vehicle; said leg portions in the region of the bumper being of U-shaped cross section with the open side thereof engaging the outer face of the bumper and housing the means by which the bumper is attached to the vehicle.

ROBERT N. BAKER.

REFERENCES CITED

The following references are of record in the file of this patent:

UNITED STATES PATENTS

| Number | Name | Date |
| --- | --- | --- |
| D. 153,904 | Rygasewicz | May 24, 1949 |
| 1,166,593 | Jelalian | Jan. 4, 1916 |
| 1,798,278 | Scott et al. | Mar. 31, 1931 |
| 2,224,434 | Jandus | Dec. 10, 1940 |